United States Patent [19]

Horacek et al.

[11] Patent Number: 4,863,790

[45] Date of Patent: Sep. 5, 1989

[54] COMPOSITE MATERIAL MADE OF POLYPROPYLENE WHICH IS REINFORCED BY FIBER MATS

[75] Inventors: Heinrich Horacek, Linz; Franz Kügler, Ansfelden, both of Austria

[73] Assignee: Danutec Werkstoff Gesellschaft m.b.H., Linz, Austria

[21] Appl. No.: 221,221

[22] Filed: Jul. 19, 1988

[30] Foreign Application Priority Data

Jul. 21, 1987 [DE] Fed. Rep. of Germany ....... 3724155

[51] Int. Cl.$^4$ .............................................. B32B 15/00
[52] U.S. Cl. .................................. 428/285; 428/284; 428/286; 428/290; 428/300
[58] Field of Search .............. 428/212, 219, 220, 284, 428/285, 286, 287, 300, 408, 902, 920, 290

[56] References Cited

U.S. PATENT DOCUMENTS 4,224,216  9/1980  Locatelli et al. ................. 260/42.18

FOREIGN PATENT DOCUMENTS 0102096  3/1984  European Pat. Off. .
0206034  12/1986  European Pat. Off. .
1241981  6/1967  Fed. Rep. of Germany .

OTHER PUBLICATIONS

Chemical Abstracts, vol. 68, Col. 404369 (1968).
Chemical Abstracts, vol. 97, Col. 39833b (1982).
Chemical Abstracts, vol. 100, Col. 140316r (1984).
Chemical Abstracts, vol. 101, Col. 24510w (1984).
L. Raspopov et al., Vyskomol. Soyed. 5, No. 12, 1761–1764 (1963).

Primary Examiner—James J. Bell
Attorney, Agent, or Firm—Wenderoth, Lind & Ponack

[57] ABSTRACT

A composite material which comprises polypropylene having a bimodal molecular weight distribution and which is reinforced by fiber mats. The polypropylene is composed of two fractions having different molecular weights.

7 Claims, No Drawings

COMPOSITE MATERIAL MADE OF POLYPROPYLENE WHICH IS REINFORCED BY FIBER MATS

The invention relates to a composite material made of polypropylene which is reinforced by fiber mats and has a bimodal molecular weight distribution, the polypropylene comprising a low-molecular-weight polypropylene fraction and a higher-molecular-weight polypropylene fraction.

The production of sheets of polypropylene reinforced by glass fiber mats is described, for example, in GB No. 2,040,801, where the glass fiber mats are impregnated under pressure with molten polypropylene in a warmed lamination zone, and the composite sheet formed is then cooled under pressure in a cooling zone in order to solidify the polypropylene. In order to improve the sheet structure and the sheet surface, thermoplastic films can simultaneously also be press-molded onto the outer sides.

Fiber mat-reinforced sheets of this type are used, for example, for the production of construction parts in the mechanical engineering industry or in the automobile industry, the sheets being compression-molded in the subsequent hot-pressing operation in heated compression molds under pressure to give the appropriate moldings.

In order to obtain composite materials having good mechanical properties, good soaking and wetting of the fiber mats with the molten polypropylene is essential during sheet production. Commercially available polypropylenes are employed, which means that reinforcing fibers and polypropylene are not distributed homogeneously throughout the thickness of the finished composite sheet, but instead a layered structure is produced due to the inadequate penetration of the polypropylene into the interior of the fiber mats. When two fiber mats are used between which, for example, molten polypropylene is extruded, a layered structure is produced having a high polypropylene content in the central zone and having only a little polypropylene in the peripheral zones. Because of the uneven impregnation and the inhomogeneous fiber distribution, composite sheets of this type also exhibit poor and uneven mechanical properties, and poor surface quality, i.e. above all glass appears at the surface.

Better impregnation of the fiber mats can be achieved, for example, by using a readily flowing polypropylene. However, the disadvantage then arises that, during subsequent hot pressing of the sheets, the polypropylene preferentially flows into the edges and into the poorly accessible parts of the molding, such as, for example, into undercuts and ribs, as a consequence of separation of the readily flowing polypropylene and the poorly flowing fibers, whereas the reinforcing fibers do not reach these distant parts or only do so to a small extent. This causes only slight reinforcement in these parts, or none at all, which means that correspondingly worse mechanical properties are also present at these points.

A certain improvement in these disadvantages is achieved in EPA No. 211,249 (Chemical Abstracts, Vol. 106, ref. 103494a) by impregnating glass fiber mats with a low-molecular-weight polypropylene having a narrow, precisely defined molecular weight distribution. However, the composite sheets produced using this polypropylene exhibit a uniformity of glass distribution which is inadequate for top-grade quality, due to which neither optimum values for the mechanical properties nor a sufficiently good surface quality are achieved.

The object of the present invention was accordingly to find a composite material, made of polypropylene reinforced by fiber mats, which has good mechanical and optical properties and is distinguished both by flaw-free impregnation during sheet manufacture and by flaw-free processing without separation of the reinforcement fibers during subsequent hot pressing, in particular during press-molding to form complicated finished parts.

Surprisingly, it has been found that improved composite materials of this type can be produced by impregnating fiber mats with a polypropylene having a bimodal molecular weight distribution, a polypropylene comprising a low-molecular weight and a high-molecular-weight polypropylene fraction.

The present invention accordingly relates to a composite material essentially comprising polypropylene and a reinforcement made of one or more fiber mats, wherein the polypropylene has a bimodal molecular weight distribution, the weight average molecular weights of the higher-molecular-weight fraction being 150,000–900,000 g/mol and those of the low-molecular-weight fraction being 50,000–150,000 g/mol, and the difference between the weight average molecular weights of the individual fractions being at least 50,000 g/mol.

A bimodal molecular weight distribution can be determined, for example, by means of gel permeation chromatography, 2 peaks occurring in the molecular weight curves (Encyclopedia of Polymer Science and Engineering, 2nd Ed., Vol. 3, J. Wiley, New York (1985), pp. 501–502). In addition, the mean molecular weight of a bimodal polypropylene is higher than that of a unimodal polypropylene of the same melt flow index (MFI).

Preferred polypropylenes are those having a weight average molecular weight from 180,000 to 500,000 g/mol for the higher-molecular-weight fraction and from 80,000 to 120,000 g/mol for the low-molecular-weight fraction. The molecular weight curves were determined in accordance with ASTM-D 3593-80 by gel permeation chromatography.

The bimodal molecular weight distribution can either be achieved during polymerization of the propylene by appropriate control of the individual polymerization steps, each of the various polymerization steps being carried out to the desired degree of polymerization with addition of a regulator, or by mixing polypropylenes of various molecular weights with one another. The low-molecular-weight fraction is produced here preferably by oxidative degradation of a higher-molecular-weight polypropylene to the desired molecular weight, for example with the aid of an organic peroxide, such as, for example, described in H. P. Frank, Polypropylene, Gordon and Breach 1968, pages 92 and 93.

Direct polymerization to the desired low-molecular-weight polypropylene is also possible, the polymerization being carried out with addition of a regulator, only as far as the molecular weight desired. Suitable polypropylenes are, in particular, partially crystalline polypropylenes having a degree of crystallinity of at least 35% and an isotacticity index of greater than 90% (ISO 1873). It is possible to employ both homopolymers and copolymers, for example propylene-ethylene copolymers having an ethylene content of up to about 30 mol %.

The proportion of the low-molecular-weight fraction is preferably 10–60 % by weight, particularly preferably 15–50 % by weight, relative to the total amount of polypropylene. The melt flow index (MFI), measured in accordance with ISO R 1133, Procedure 12, at 230° C. and a load of 2.16 kg, of the polypropylene mixture used for impregnating the fiber mats is preferably 75–600 g/10 min, particularly preferably 100–300 g/10 min. The MFI desired can be adjusted here, corresponding to the desired properties of the composite material or in view of optimum processing conditions, by simply mixing the two polypropylene fractions.

In accordance with the demands made on the mechanical properties of the sheets, various fiber mats can be employed, such as, for example, those made of glass fibers, carbon fibers or aramid fibers, or mixtures of fibers or mats made of various fibers. Glass fiber mats are preferably used. The proportion of glass fibers in the finished composite material is usually about 10–50% by weight.

Carbon fibers or aramid fibers are employed, above all, where particular demands are placed, in particular, on the strength or rigidity of the sheets, along with low specific weight. The fiber mats can comprise either staple fibers, preferably 10–250 mm in length, or continuous filaments laid to form a web, it being possible for the fibers and filaments to be randomly arranged or oriented. The fiber mats are preferably consolidated mechanically, for example by needling, sewing or stitching. The basis weight of the fiber mats is preferably 250–1,200 g/m$^2$.

The composite materials according to the invention are produced, for example, by melting the polypropylene mixture together with the customary additives, such as, for example, stabilizers, fillers, flame-proofing agents, etc., in an extruder, extruding the mixture through a flat-film dye, combining the extrudate, still in the liquid stage, with one or more fiber mats, and subsequently press molding the composite material and cooling the molding, preferably continuously between the belts of a twin-belt press. The composite sheets obtained usually have a thickness of 1–10 mm and can be press molded to form qualitatively high-quality moldings having an even fiber distribution and a particularly high surface quality.

The flexural strength in accordance with DIN 53452 and the modulus of elasticity on bending in accordance with DIN 53457 were measured on the composite sheets produced in accordance with the examples below.

The evenness of the distribution of the reinforcement fibers (G), the flowability (F) and the surface quality were determined on 100×100 mm composite sheets which had been heated to 220° C. in an infra-red oven and press-molded in a press at a sheet temperature of 70° C. and a specific pressure of 98 bar.

The flowability was expressed as the % increase in area on the pressing and corresponds to the increase in area in cm$^2$ of the 100 cm$^2$ sample sheets used.

$$F = \frac{(\text{area after pressing} - 100)}{100 \text{ cm}^2} \times 100 \, (\%)$$

High flowability is advantageous, above all, since only low pressing forces would then be necessary, even on pressing of large areas.

The evenness of the fiber distribution is determined for sheets reinforced with glass fibers by separately ashing the pressed part corresponding to the sheet surface area of 100 cm$^2$ before pressing (internal surface) and the part of the pressed sample corresponding to the increase in area (external surface) in a muffle furnace at 600° C. A comparison of the glass content Gi (glass weight per unit area) of the internal surface with the glass content Ga of the external surface in accordance with the formula $$G = \left(\frac{Gi}{Ga} - 1\right) \times 100$$

is the measure of the evenness of the glass distribution, where G would be 0 in the ideal case. The smaller the G, the less the separation of fibers and polypropylene in the pressed part and the better the fibers flow, even into distant and poorly accessible parts, such as, for example, in undercuts and ribs. In the case of sheets reinforced with carbon fibers or aramid fibers, the fibers were obtained by separately dissolving the matrix of the internal and external surfaces.

The surface quality was determined by optical assessment of the surface smoothness and evenness of the pressed sheets.

EXAMPLE 1

A granule mixture of 80 parts of a polypropylene having a mean molecular weight of 210,000 g/mol and an MFI of 50 g/10 min (PP-A, corresponding to Daplen ® US 10 from Petrochemie Danubia), 20 parts of a polypropylene degraded from Propathene ® GL 608 E from ICI at 200°–220° C. in a twin-screw extruder using Perkadox ® 14–90 (Akzo) to a mean molecular weight of 106,000 g/mol and an MFI of 1,500 g/10 min (PP-B), 3 parts of long-term stabilizer, 1 part of processing stabilizer and 1.25 parts of carbon black batch was melted in an extruder at 200°–220° C., homogenized and extruded through a flat-film dye as a melt film, which was passed continuously between 2 glass fiber mats (basis weight 650 g/m$^2$ each, comprising needled staple fibers 50 mm in length) to a twin-belt press. Here, the mats were impregnated under the action of pressure and temperature with the polypropylene mixture which had an MFI of 200 g/10 min, and the composite sheet obtained was consolidated under pressure in a subsequent cooling zone. A 3.7 mm thick composite sheet having a glass content of 30% by weight was obtained.

The modulus of elasticity on bending of the sheet was 5,000 N/mm$^2$, the flexural strength was 115 N/mm$^2$, F=170% and G=15%.

EXAMPLES 2–4

Composite sheets were produced analogously to Example 1, but different proportions of high-molecular-weight (PP-A) and low-molecular-weight polypropylene (PP-B) were employed, as shown in Table 1. The values for MFI, modulus of elasticity, flexural strength, F, G and surface quality are likewise collated in Table 1.

EXAMPLE 5

Composite sheets were produced analogously to Example 1, but a polypropylene mixture comprising 65 parts of a polypropylene having a mean molecular weight of 900,000 g/mol and an MFI of 0.3 g/10 min (PP-A1) and 35 parts of PP-B were used. The values for the properties of the composite sheets obtained and of the sheets press-molded therefrom are collated in Table 1.

COMPARATIVE EXAMPLES V6 AND V7

Composite sheets were produced analogously to Example 1, but the bimodal polypropylene granule mixture was replaced in V6 by 100 parts of a polypropylene comprising only PP-B and in V7 by 100 parts of a polypropylene comprising only PP-A. The values for the properties of the composite sheets obtained and for the sheets press-molded therefrom are collated in Table 1.

COMPARATIVE EXAMPLE V8

Composite sheets were produced analogously to Example 1, but the polypropylene granule mixture was replaced by 100 parts of a PP-B1 obtained by oxidative degradation of Propathene ® GS 608 E (ICI) by means of Perkadox ® 14-90 in a twin-screw extruder at 200°-220° C. to an MFI of 200 g/10 min. The values for the properties of the finished sheets are collated in Table 1.

EXAMPLE 9

Composite sheets were produced analogously to Example 1 but the 2 glass fiber mats were replaced by 2×12 carbon fiber mats having a basis weight of 55 g/m² each and a mean fiber length of 15 mm. The values for the properties of the finished sheets are collated in Table 1.

COMPARATIVE EXAMPLE V10

Composite sheets were produced analogously to Example 1, but
(a) the 2 glass fiber mats were replaced by 2×12 carbon fiber mats as in Example 9, and
(b) the bimodal polypropylene granule mixture was replaced by 100 parts of a polypropylene comprising only PP-A.

The values for the properties of the finished sheets are collated in Table 1.

EXAMPLE 11

Composite sheets were produced analogously to Example 1, but the 2 glass fiber mats were replaced by 2×4 aramid fiber mats having a basis weight of 165 g/m² each and a mean fiber length of 60 mm. The values for the properties of the finished sheets are collated in Table 1.

COMPARATIVE EXAMPLE V12

Composite sheets were produced analogously to Example 1, but
(a) the 2 glass fiber mats were replaced by 2×4 aramid fiber mats as in Example 11, and
(b) the bimodal polypropylene granule mixture was replaced by 100 parts of a polypropylene comprising only PP-A.

The values for the properties of the finished sheets are collated in Table 1.

TABLE 1

| | PP(Parts) | | | | MFI g/10 min | Modulus of elasticity on bending N/mm² | Flexural strength N/mm² | F % | G % | Surface quality |
|---|---|---|---|---|---|---|---|---|---|---|
| | A | A1 | B | B1 | | | | | | |
| 1 | 80 | — | 20 | — | 200 | 5000 | 115 | 170 | 15 | very good |
| 2 | 60 | — | 40 | — | 450 | 5000 | 120 | 180 | 15 | very good |
| 3 | 40 | — | 60 | — | 775 | 4800 | 100 | 200 | 20 | very good |
| 4 | 20 | — | 80 | — | 1135 | 4750 | 80 | 220 | 20 | very good |
| 5 | — | 65 | 35 | — | 200 | 4750 | 130 | 180 | 10 | very good |
| V6 | — | — | 100 | — | 1500 | 4600 | 100 | 240 | 15 | very good |
| V7 | 100 | — | — | — | 50 | 7800 | 116 | 100 | 200 | low |
| V8 | — | — | — | 100 | 200 | 4500 | 85 | 170 | 25 | good |
| 9 | 80 | — | 20 | — | 200 | 7000 | 150 | 200 | 10 | very good |
| V10 | 100 | — | — | — | 50 | 9500 | 145 | 120 | 110 | low |
| 11 | 80 | — | 20 | — | 200 | 4000 | 90 | 150 | 15 | very good |
| V12 | 100 | — | — | — | 50 | 5000 | 100 | 100 | 120 | low |

From the values collated in Table 1 for the properties, it is clear that, when the polypropylene, according to the invention, having a bimodal molecular weight distribution is used, better mechanical properties and flow properties of the finished composite material, more even fiber distribution and better surface quality of the sheets press-molded therefrom could be obtained than is possible when uniform polypropylenes having a unimodal molecular weight distribution are used. The very high modulus of elasticity in comparative examples V7, V10 and V12 is attributable to the layered structure in the semi-finished article caused by uneven impregnation. After hot pressing, an essentially lower modulus of elasticity is measured in the finished molding in which a layered structure no longer occurs (e.g. 4,200 N/mm² in V7).

What is claimed is:

1. A composite material mainly comprising a polypropylene sheet, reinforced with 1 to 24 non-woven fiber mats, wherein the polypropylene comprises a high molecular-weight fraction with water average molecular weights of 150,000 to 900,000 g/mol, and a low molecular-weight fraction with weight average molecular weights of 50,000 to 150,000 g/mol, the difference between the weight average molecular weights of the individual fractions being at least 50,000 g/mol.

2. The composite material as claimed in claim 1, wherein the weight average molecular weights of the higher-molecular-weight fraction are 180,000 to 500,000 g/mol and those of the low-molecular-weight fraction are 80,000 to 120,000 g/mol.

3. The composite material as claimed in claim 1, wherein the low-molecular-weight fraction is present in amounts from 10 to 60% by weight, relative to polypropylene.

4. The composite material as claimed in claim 3, wherein the low-molecular-weight fraction is present in amounts from 15 to 50% by weight, relative to polypropylene.

5. The composite material as claimed in claim 1, wherein the polypropylene has a melt flow index of 75 to 600 g/10 min at 230° C. and 2.16 kg.

6. The composite material as claimed in claim 5, wherein the polypropylene has a melt flow index of 100 to 300 g/10 min at 230° C. and 2.16 kg.

7. The composite material as claimed in claim 1, wherein the fiber mats comprise glass fibers.

* * * * *